Patented July 27, 1954

2,684,954

UNITED STATES PATENT OFFICE 2,684,954

AQUEOUS EMULSION POLYMERIZATION UTILIZING WATER-SOLUBLE SALTS OF N-DODECYL-BETA-ALANINES

James R. Miller, Cuyahoga Falls, Ohio, assignor to The B. F. Goodrich Company, New York, N. Y., a corporation of New York No Drawing. Application May 22, 1951, Serial No. 227,737

4 Claims. (Cl. 260—29.7)

The present invention relates to improvements in aqueous emulsion polymerization and pertains more particularly to improvements in the production of synthetic rubbers and resins by the polymerization of various monomeric materials in aqueous emulsion utilizing, as an emulsifying agent, a water-soluble salt of an N-alkyl-beta-alanine.

Monomeric materials both monoolefinic and polyolefinic in nature, including vinyl compounds such as vinyl chloride, styrene, acrylate esters, etc., and also conjugated dienes such as butadiene-1,3, chloroprene, etc., have been polymerized in aqueous emulsion utilizing a wide variety of emulsifying and dispersing agents. Among the materials which have been used are colloidal protective materials such as bentonite clay, casein and starch derivatives, amino alcohols, polyvinyl alcohol and other hydrolyzed ester-type polymers; ordinary alkali soaps of fatty acids or rosin acids, various synthetic saponaceous materials such as the hymolal sulfates and alkaryl sulfonates and other anionic emulsifiers; and also cationic emulsifiers such as the addition salts of primary alkyl amines such as lauryl amine hydrochloride and others. However, none of these emulsifying agents is entirely satisfactory as a general purpose emulsifier. One disadvantage is that it has been necessary to vary the emulsifier in changing from one monomer system to another and in changing from one catalyst system to another at different reaction temperatures. For example, in the preparation of general purpose butadiene styrene rubbers at temperatures of 35 to 50° C. the use of rosin acid soaps as emulsifiers produces polymers of excellent properties. When butadiene and styrene are polymerized at lower temperatures of —10 to 10° C., however, so as to produce the so-called "cold rubber" it has been found that the fatty acid soaps are preferable to rosin acid soaps. In contrast, fatty acid soaps are generally poor emulsifiers for emulsion polymerization of vinyl compounds since they yield emulsions or resin latices of relatively poor stability. Similarly, the other known emulsifying agents while advantageously used under certain conditions, possess marked disadvantages under other conditions.

I have now discovered that monomeric materials generally, including both monoolefinic and polyolefinic unsaturated compounds, are efficiently polymerized in an aqueous emulsion containing, as emulsifier, a water-soluble salt of an N-alkyl substituted beta-alanine (a beta-amino propionic acid) in which an alkyl substituent group contains at least 8 carbon atoms, preferably from 10 to 25 carbon atoms, in a very short reaction time and with the production of exceedingly stable aqueous polymeric dispersions. The N-alkyl beta-alanines useful for this purpose have the general structure

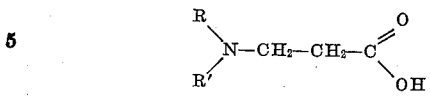

in which R is hydrogen or alkyl and R' is an alkyl group of at least 8 carbon atoms. They are converted to useful anionic-type polymerization emulsifiers by reaction with an alkali such as sodium, potassium, lithium, or ammonium hydroxide or an organic base such as ethylamine, diethylamine or the like, and to useful cationic-type emulsifiers by reaction with suitable mineral acetic acid acids such as hydrochloric acid, acetic acid and others which yield water-soluble addition salts. Thus, the salts of N-alkyl beta-alanines form a class of polymerization emulsifiers useful over a very wide pH range from strongly acid to strongly alkaline, depending on the kind and amount of salt-forming reagent utilized.

The N-alkyl-beta-alanines may be produced by reaction in solution between beta-propiolactone and a long chain alkyl amine. N-dodecyl-beta-alanine, for example, is made by separately dissolving beta-propiolactone and dodecylamine in acetonitrile, the solution of amine then being added gradually to the beta-propiolactone solution while maintaining the reaction mixture at a temperature of about 35° C. The white crystalline product obtained is then filtered and dried under vacuum to yield a product melting at 82 to 84° C. and analyzing 69.99% carbon, 11.84% hydrogen and 5.43% nitrogen. Other N-alkyl-beta-alanines are similarly made by substituting the proper alkyl amine for the dodecyl amine in the above illustration.

Illustrative compounds of the above class of N-alkyl beta-alanines include a N-decyl-beta-alanine, N,N-didecyl-beta-alanine, N-undecyl-beta-alanine, N-dodecyl-beta-alanine, N,N-di-dodecyl - beta - alanine, N-tridecyl-beta-alanine, N-tetradecyl - beta - alanine, N-pentadecyl-beta-alanine, N,N - dipentadecyl - beta - alanine, N - hexadecyl - beta - alanine, N,N - dihexadecyl-beta - alanine, N - nonadecyl - beta - alanine, N - eicosyl - beta - alanine, N - docosyl - beta-alanine, N - pentacosyl - beta - alanine, N,N-dipentacosyl-beta-alanine and others. The salts of N-mono-alkyl-beta-alanines in which the alkyl group contains from 10 to 18 carbon atoms are particularly preferred because of their superior emulsifying power and N-dodecyl-beta-alanine is the most proficient in this respect.

In the practice of this invention monomeric compounds or mixtures of monomers are polymerized in an aqueous medium containing a water-soluble salt of an N-alkyl-beta-alanine and also containing, if desired, one or more other polymerization promoting materials.

The most essential class of polymerization promoting materials are the peroxygen catalysts, one or more of which is ordinarily used. Examples of such catalysts include hydrogen peroxide, benzoyl peroxide, o,o'-dichlorobenzoyl peroxide, caproyl peroxide, caprylyl peroxide, pelargonyl peroxide, cumene monohydroperoxide, tertiary butyl monohydroperoxide, triisopropylbenzene monohydroperoxide, 1-hydroxycyclohexyl monohydroperoxide, tertiary butyl diperphthalate, tertiary butyl perbenzoate, sodium, potassium and ammonium persulfate and others and combinations of these with reducing agents (in what is known as "redox" catalysts) such as sodium sulfite, sugars, ferrous gluconate, various amines, and others both with and without small amounts of heavy metal salts such as ferrous and ferric sulfates, copper sulfate, cobalt chloride, potassium ferricyanide and the like. Another class of polymerization-promoting materials ordinarily used in polymerization of diene to give synthetic rubbers in the class of polymerization modifiers such as diisopropyl xanthogen disulfide, the alkyl mercaptans such as dodecyl mercaptan, t-dodecyl mercaptan, and others. Still other polymerization promoting materials include electrolytes and buffers such as sodium and potassium pyrophosphates, potassium chloride, sodium bicarbonate, sodium carbonate, trisodium phosphate, sodium, potassium and ammonium hydroxide and others. Additional emulsifying agents may also be used, most effective of these being the fatty acid and rosin acid soaps, the hymolal sulfates and alkaryl sulfonates, the addition salts of long chain alkyl amines, and other ionic emulsifiers.

In carrying out the polymerization, an aqueous emulsion of monomeric material is first prepared using an emulsifier of this invention. The N-alkyl-beta-alanine may be neutralized by the addition of alkali or acid to form the emulsifying salt before addition to the aqueous medium but more conveniently the N-alkyl-beta-alanine is added to the aqueous medium as such together with an appropriate quantity of neutralizing agent so that neutralization may occur in situ. The pH of the aqueous medium thus is conveniently adjusted by addition of a quantity of neutralizer calculated to yield the desired partial or complete neutralization of the N-alkyl-beta-alanine and in some cases, an excess of the neutralizer to yield a highly alkaline or highly acid reaction medium. After all the ingredients are added the reaction mixture is agitated and its temperature controlled by supplying a coolant or heating medium until polymerization proceeds to the desired degree and a stable aqueous dispersion of polymer is obtained. The temperature of polymerization is not critical and may vary from as low as —10° C. or lower to as high as 80° C. or higher.

The amount of the emulsifier of this invention needed for efficient emulsification and the production of stable polymeric dispersions will vary somewhat depending on the monomers polymerized and on the composition of the aqueous medium. For example, as little as 0.10 to 1.0% of a water-soluble salt of an N-alkyl-beta-alanine will yield a stable dispersion of a vinylidene chloride vinyl chloride copolymer or a stable synthetic rubber latex from the polymerization of mixtures of butadiene and styrene or acrylonitrile. The incorporation of certain polymerization-promoting substances such as electrolytes and buffers sometimes makes necessary the utilization of slightly larger amounts of emulsifier. In general amounts of an emulsifier of this invention ranging from 010 to 15% by weight (as unneutralized N-alkyl-beta-alanine) are found satisfactory for most purposes when sufficient acid or alkaline neutralizing agents are utilized as to yield at least 0.1 to 10% of the water-soluble emulsifying salt.

The hydrogen ion concentration of the aqueous reaction medium has a profound effect on the reaction rate obtainable in aqueous emulsion polymerization with known emulsifiers. The N-alkyl-beta-alanines, however, are useful over a very wide pH range with the obtainment of maximum reaction rates. For example, mixtures of butadiene with styrene and/or acrylonitrile have been polymerized to substantial completion at temperatures ranging from 5 to 40° C. in as little as 8 to 15 hours at a pH ranging from 1.5 or lower to 9.0 or higher. In general the pH of the reaction medium may vary from as low as 1.5 to as high as 11.5, depending on the other ingredients of the reaction medium, with obtainment of maximum reaction rates.

The method of this invention is applicable generally to the polymerization of unsaturated compounds polymerizable in aqueous emulsion, particularly those containing the $CH_2=C<$ group, that is, vinylidene compounds containing a terminal methylene group attached by a double bond to a carbon atom. Examples of such compounds include vinylidene compounds containing only one carbon-to-carbon unsaturated bond such as vinyl chloride, vinylidene chloride, styrene, p-chlorostyrene, 3,5 - dichlorostyrene, p - methoxy styrene, the acrylic acids such as acrylic acid, methacrylic acid and their nitriles, esters and amides such as acrylonitrile, methacrylonitrile, alpha-chloro acrylonitrile, methyl acrylate, ethyl acrylate, methyl methacrylate, butyl ethacrylate, methacrylamide, N,N-dimethyl acrylamide, vinyl esters such as vinyl acetate, vinyl propionate, vinyl benzoate and the like, vinyl methyl ketone, vinyl methyl ether, vinyl pyridine, vinyl carbazole, isobutylene, ethylene, and other similar monoolefinic polymerizable compounds. Other vinylidene compounds containing more than one unsaturated linkage which may be polymerized in the presence of the water-soluble salts of N-alkyl-beta-alanines either alone or with the above or other monoolefinic copolymerizable monomers include the conjugated dienes such as butadiene-1,3, isoprene, and other butadiene-1,3 hydrocarbons, chloroprene, 3-cyano butadiene-1,3, as well as trienes such as myrcene and compounds containing olefinic and acetylenic unsaturated carbon-to-carbon bonds such as vinyl acetylene, vinyl ethynyl diethyl carbinol and the like. The above vinylidene compounds may be copolymerized with one another, in mixtures of two or more, or with one or more other unsaturated polymerizable materials such as diethyl maleate, diethyl fumarate, maleic acid or anhydride and others.

It is to be understood from the above examples that vinyl compounds are a sub-genus of vinylidene compounds since they contain the characteristic $CH_2=C<$ structure, one of the free valences being connected to hydrogen to form the (vinyl)

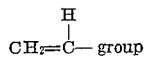

The water-soluble salts of the N-alkyl-betaalanines of this invention are particularly applicable to the polymerization of monomeric mixtures comprising a major proportion (i. e. at least 50% by weight) of a butadiene-1,3 hydrocarbon such as butadiene-1,3 and a lesser proportion of a copolymerizable monomer such as styrene, acrylic acid and methacrylic acid and their esters, amides and nitriles, vinylidene chloride, vinyl pyridine, and others and to the polymerization of monomeric mixtures comprising a major proportion of a chloroethylene containing from one to two chlorine atoms on one only of the carbon atoms and which have only hydrogen atoms on the remaining valences of the carbon atoms, that is, vinyl chloride and vinylidene chloride, mixtures of these materials and mixtures of one or both of these with lesser proportions of materials such as methyl acrylate, ethyl acrylate, methyl methacrylate, ethyl alpha-chloro acrylate, acrylonitrile, methacrylonitrile, vinyl acetate, vinyl propionate, vinyl benzoate, vinyl bromide, vinyl fluoride, vinylidene bromide, vinylidene chlorofluoride, and others.

Particularly useful aqueous polymeric dispersions are obtained with monomeric mixtures comprising from 75 to 90% by weight of vinylidene chloride, 5 to 15% vinyl chloride and 5 to 15% of any alkyl acrylate such as ethyl acrylate for the product in this case is a film-forming latex especially adapted as a fruit-dipping latex (antitranspirant coating), as a paper and textile coating and impregnating composition, and as a latex for the formation of air-dried unsupported film. Particularly useful synthetic rubber latices are obtained by the polymerization in aqueous medium containing a water-soluble salt of an N-alkyl-beta-alanine of monomeric mixtures comprising from 50 to 95% by weight of a butadiene-1,3 hydrocarbon and 5 to 50% styrene and mixtures comprising from 50 to 85% of a butadiene-1,3 hydrocarbon and from 15 to 50% by weight of an acrylic nitrile such as acrylonitrile.

The invention will be described with reference to the following specific examples which are intended to be merely illustrative of the invention and not a limitation on the scope thereof.

*Example 1*

The ammonium salt and the hydrochloric acid salt of N-dodecyl-beta-alanine are utilized in the emulsion polymerization of a mixture of 67% by weight of butadiene-1,3 and 33% by weight of acrylonitrile, along with a control polymerization using a fatty acid soap emulsifier. The following materials were used in producing the reaction mixtures. All parts unless otherwise specified are by weight.

| Material | Sample A | Sample B | Control |
|---|---|---|---|
| Butadiene-1,3 | 67.0 | 67.0 | 67.0 |
| Acrylonitrile | 33.0 | 33.0 | 33.0 |
| Polymerization DDM [1] | 0.4 | 0.4 | 0.4 |
| (NH$_4$)$_2$S$_2$O$_8$ | 0.3 | 0.3 | 0.3 |
| N-dodecyl-beta-alanine | 4.0 | 7.0 | |
| NH$_4$OH (conc.) | 120% neutralized. | | |
| Hydrochloric acid (conc.) | | 100% neutralized. | |
| Sodium fatty acid soap | | | 4.0 |
| Water | 180.0 | 237 | 180.0 |

[1] A mixture of predominantly C$_{12}$ primary mercaptans. Percent SH-14.25.

The water, soap, catalysts, acid or alkali, and an aqueous emulsion of the mercaptan are combined in the reaction vessel, the acrylonitrile is then added and the vessel sealed and evacuated. The vacuum is broken by the addition of the butadiene and the resulting mixture in each case is agitated at 40° C. until zero pressure is observed indicating substantially complete polymerization. The results are as follows:

| | Sample A | Sample B | Control |
|---|---|---|---|
| Hours to zero pressure | <15 | 8 | >20. |
| Percent Conversion | 97.0 | 99.4 | ca. 80%. |
| Final pH of Latex | 8.7 | 1.8 | 8.0. |
| Type Latex | Anionic | Cationic | Anionic. |

Samples B and A required only 8 hours and less than 15 hours, respectively, to reach substantially complete conversion while the control utilizing sodium fatty acid soap (polymerization grade) did not react to completion in 20 hours at the same temperature. Also, by way of comparison, a similar reaction medium containing about 4.0 parts by weight per 100 of monomers of lauryl amine (100% neutralized with HCl) required more than 20 hours to reach completion. Thus the ammonium salt of N-dodecyl-beta-alanine is an ionic emulsifier superior to ordinary sodium fatty acid soap and its hydrochloride is a cationic polymerization emulsifier superior to lauryl amine hydrochloride.

*Example 2*

The hydrochloride of N-dodecyl-beta-alanine is useful in the production of a cationic vinyl-type latex from reaction mixtures having the following composition, in which parts are by weight:

| Material | Sample C | Sample D |
|---|---|---|
| Vinylidene chloride | 15.4 | 15.4 |
| Vinyl chloride | 2.3 | 2.3 |
| Methyl acrylate | 2.3 | 2.3 |
| K$_2$S$_2$O$_8$ | 0.1 | 0.1 |
| N-dodecyl-beta-alanine | 1.0 | 0.75 |
| Hydrochloric acid (1N) ml | [1] 3.9 | [2] 2.9 |
| Water | 26.0 | 27.0 |

[1] Sufficient to neutralize 35.5% of N-dodecyl-beta-alanine.
[2] Sufficient to neutralize 26.4% of N-dodecyl-beta-alanine.

The reaction mixture in each case is maintained at 50° C. until zero pressure in the reaction vessel is obtained indicating substantially complete reaction (98 to 99% conversion). Sample C reacts to zero pressure in 9 hours and sample D in about 12 hours producing in each case a stable aqueous polymeric dispersion or latex. Similar reactions employing lauryl amine hydrochloride or other quaternary ammonium salts of long chain alkyl amines as emulsifying agents require reaction periods of from 2 to 10 hours longer to reach completion. Samples of solid polymer from the latices of samples C and D when heated in air for one hour at 125° F. are superior in their heat resistance to polymers prepared in the presence of the quaternary ammonium alkyl amine salts as emulsifying agents.

*Example 3*

The previous examples have demonstrated the utility of the salts of the N-alkyl-beta-alanines in both diene and vinyl polymerizations conducted at ordinary temperatures of 40 and 50° C. The potassium salt of N-dodecyl-beta-alanine is of great utility in the low temperature redox-catalyzed systems for production of "cold rubber." For example, butadiene and styrene are polymerized at 5° C. in a cumene hydroperoxide sugar recipe (commonly employed in "cold rubber" manufacture) having the following composition:

| Material: | Parts/weight |
|---|---|
| Butadiene | 72.0 |
| Styrene | 28.0 |
| N-dodecyl-beta-alanine | 4.5 |
| Polymerization DDM | 0.25 |
| Cumene hydroperoxide | 0.10 |
| Potassium pyrophosphate | 0.15 |
| KCl | 0.50 |
| KOH[1] | 0.10 |
| FeSO$_4$·7H$_2$O | 0.10 |
| Dextrose | 1.00 |
| Water | 175.00 |

[1] Sufficient to neutralize approximately 10.0% of the N-dodecyl-beta-alanine.

The dextrose and potassium hydroxide solutions are heated to 212° F. before being added to the reaction vessel. A conversion of 82% is obtained in 16 hours at which point 0.1% on the polymer of dinitrochlorobenzene is added to shortstop the reaction. The product is an excellent stable latex containing no coagulum.

A similar mixture of butadiene and styrene is efficiently converted to high quality "cold rubber" by the polymerization of the monomers contained in a reaction medium having the following composition:

| Material: | Parts/weight |
|---|---|
| Butadiene | 72.0 |
| Styrene | 28.0 |
| N-dodecyl-beta-alanine | 4.5 |
| Polymerization DDM | 0.25 |
| Cumene hydroperoxide | 0.15 |
| KOH | 0.10 |
| KCl | 0.50 |
| Ferrous gluconate | 0.44 |
| Water | 175.00 |

A conversion of 66% was obtained in 9 hours at 5° C. The product again is a stable coagulum-free latex. Similar recipes employing comparable amounts of sodium oleate or lauryl amine hydrochloride as emulsifiers require longer reaction times.

In a similar fashion both anionic and cationic latices result from the polymerization in the presence of a salt of an N-alkyl-beta-alanine of monomeric mixtures containing (1) butadiene and methyl methacrylate, (2) butadiene, styrene and vinyl pyridine, (3) butadiene, acrylonitrile, and an olefinically unsaturated acid such as sorbic acid, acrylic acid, methacrylic acid and others, (4) styrene and acrylonitrile, (5) vinyl chloride, vinyl acetate and maleic acid, (6) vinyl chloride, octyl acrylate, and vinyl benzoate, and (7) vinyl chloride alone. In each case the reaction rate is faster and the product is an aqueous dispersion or latex of improved stability over those obtainable with conventional anionic and cationic emulsifiers.

The latices produced by the method of this invention, such as those obtained in Examples 1 to 3, are of considerable utility in dipping, coating and impregnating textiles, paper, leather, and related materials because of the unique affinity and excellent wetting action on the fibers of the beta-alanine emulsifiers. Because it is possible to change the charge on the emulsifier by a change of pH, it is very easy to coagulate the polymeric latices when desired. In paper coating and impregnating the paper fibers usually carry a negative charge so that when a cationic latex or polymer dispersion made with an acid salt of an N-alkyl-beta-alanine is added to the beater or used in a skim-coating operation efficient coagulation and distribution of the polymer about the fibers is obtained.

While I have disclosed certain preferred manners of performing my invention, I do not thereby desire or intend to limit myself solely thereto, for the precise proportions of the materials utilized may be varied and equivalent chemical materials employed, if desired, without departing from the spirit and scope of the invention as defined in the appended claims.

I claim:

1. In the process of manufacturing a stable synthetic rubber latex having affinity for fibrous materials such as textiles and paper and having any desired pH within the range of about 1.5 to 11.5 by the polymerization in aqueous emulsion of a monomeric material consisting essentially of from 50 to 85% by weight of butadiene-1,3 and from 15 to 50% by weight of acrylonitrile, the steps which comprise forming an aqueous emulsion of said monomeric material using N-dodecyl-beta-alanine as emulsifying agent, adding to the emulsion a sufficient quantity of a neutralizing agent selected from the class consisting of hydrochloric acid and alkali hydroxides to neutralize the N-dodecyl-beta-alanine and form the salt thereof and to produce the desired pH and then agitating the emulsion at a temperature of about .5 to 40° C. in the present of a polymerization catalyst to effect conversion of the monomeric material to polymer and thus produce the stable latex.

2. The process of claim 1 wherein the neutralizing agent is ammonium hydroxide.

3. The process of claim 1 wherein the neutralizing agent is hydrochloric acid.

4. The process of claim 1 wherein the monomeric material consists essentially of 67% butadiene-1,3 and 33% acrylonitrile.

References Cited in the file of this patent

UNITED STATES PATENTS

| Number | Name | Date |
|---|---|---|
| 2,388,372 | Stewart | Nov. 6, 1945 |
| 2,468,012 | Isbell | Apr. 19, 1949 |